United States Patent
Kasai et al.

(10) Patent No.: US 6,836,787 B1
(45) Date of Patent: Dec. 28, 2004

(54) MONITOR DEVICE FOR DISPLAYING OUTPUT DISPLAY IMAGES OF A PLURALITY OF COMPUTERS

(75) Inventors: Naruhiko Kasai, Yokohama (JP); Hiroyuki Mano, Chigasaki (JP); Shigeyuki Nishitani, Yokohama (JP); Hiroshi Kurihara, Mobara (JP); Tatsumi Mori, Isehara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/492,081

(22) Filed: Jan. 27, 2000

(30) Foreign Application Priority Data

Jan. 26, 1999 (JP) .......................................... P11-017179

(51) Int. Cl.[7] .............................................. G06F 15/16
(52) U.S. Cl. ...................... 709/204; 709/200; 709/201; 709/205; 709/244; 709/250; 345/418; 345/589; 345/619; 345/733; 345/777; 345/788
(58) Field of Search ................................ 709/200, 201, 709/204, 205, 244, 250; 345/733, 589, 777, 418, 619, 788

(56) References Cited

U.S. PATENT DOCUMENTS

| | | | | |
|---|---|---|---|---|
| 5,036,315 A | * | 7/1991 | Gurley | ........................ 345/733 |
| 5,305,435 A | * | 4/1994 | Bronson | ....................... 345/777 |
| 5,315,711 A | * | 5/1994 | Barone et al. | ............... 709/208 |
| 5,836,817 A | * | 11/1998 | Acres et al. | .................... 463/26 |
| 5,901,067 A | * | 5/1999 | Kao et al. | ....................... 700/11 |
| 5,903,455 A | * | 5/1999 | Sharpe et al. | ................. 700/83 |
| 5,973,702 A | * | 10/1999 | Orton et al. | ................. 345/619 |
| 6,061,064 A | * | 5/2000 | Reichlen | ..................... 345/418 |
| 6,075,531 A | * | 6/2000 | DeStefano | ................... 345/788 |
| 6,092,202 A | * | 7/2000 | Veil et al. | .................... 713/201 |
| 6,104,359 A | * | 8/2000 | Endres et al. | ................ 345/589 |
| 6,198,462 B1 | * | 3/2001 | Daily et al. | ..................... 345/8 |
| 2002/0067318 A1 | * | 6/2002 | Matsuzaki et al. | ............ 345/1.1 |

OTHER PUBLICATIONS

"Plug and Display Standard" Version 1, Jun. 11, 1997.

* cited by examiner

*Primary Examiner*—Nabil El-Hady
(74) *Attorney, Agent, or Firm*—Antonelli, Terry, Stout & Kraus, LLP

(57) ABSTRACT

In order to enable one monitor device to be used as the monitor device for a plurality of computers, a display controller displays a frame represented by display data entered from a second computer on a liquid crystal display in a window within a frame represented by display data entered from a first computer, and the position and size of the window are altered by the display controller on the basis of communication data for display control extracted by a communication controller and entered from the first computer or the second computer.

12 Claims, 15 Drawing Sheets

MONITOR DEVICE FOR DISPLAYING OUTPUT DISPLAY IMAGES OF A PLURALITY OF COMPUTERS

BACKGROUND OF THE INVENTION

The present invention relates to a monitor device for use in computers.

Usually, a desktop or any other stationary type computer is equipped with an easy-to-look-at large monitor device and easy-to-handle input devices such as a keyboard and a Monte. On the other hand, a laptop or palm-top portable computer is designed with a view to reducing the size and weight of the unit, with use of input devices such as a small keyboard and a pointing device, whose handling ease is sacrificed for size and weight reduction, and with a less easy-to-look-at small monitor, all integrated into the computer.

A monitor device provided on a stationary computer can receive no more than one image input at a time. As a result, if a monitor device used for displaying output display images for a computer is to be used for displaying the output display images for another computer, the connection between the monitor device and the computer needs to be rewired. Or else, the connection between the monitor device and the computer needs to be switched over with a separately provided selector or the like. This is also true of input devices. If an input device used for inputting information to a computer is to be used for inputting to another computer, the connection between the input device and the computer needs to be rewired. Or else, the connection between the input device and the computer needs to be switched over with the use of a separately provided selector or the like.

Sometimes one user may want to use a plurality of computers at the same time. In such a case, however, as input devices and monitor devices are separately provided for different computers, the user should use a different input device or look at a different monitor device for each computer. Especially where one computer is a laptop computer and another is a stationary computer, in spite of the presence in the same location of a better visible monitor device and a better operable input device provided for the stationary computer, the monitor and input device which is inferior in visibility and operability provided for the laptop computer should be used when that laptop unit is to be operated.

Thus, it is possible to use a monitor device and input device provided for one computer in the operation of another computer, but only by either rewiring the connections of the monitor device and input device to the computer or by providing and operating separate selector switches.

However, even in such an arrangement, the image displayed on the monitor device at a given time is the output display image of only one computer, and, accordingly, the user cannot check the output display images of a plurality of computers at the same time. Moreover, where the computer to be operated is changed frequently, the user has to leave the input device he or she is operating and rewire the input and monitor devices or to manipulate the separately provided switches every time the computer is changed.

SUMMARY OF THE INVENTION

An object of the present invention is to provide a monitor device which is capable of displaying output display images of a plurality of computers at the same time.

Another object of the invention is to enable the user to use, without having to leave a specific input device, that specific input device and a specific monitor device as the monitor device and input device of a plurality of computers.

In order to achieve the above-stated objects, a monitor device according to the present invention comprises a plurality of display data interfacing units for entering display data from individual computers; a plurality of communication data interfacing units for inputting/outputting communication data between the individual computers; a superposed display unit for superposed display of two or more images represented by display data entered into two or more of the display data interfacing units; and a display controller for altering the form of the superposed display on the basis of communication data for instructing alteration of the form of the superposed display, which communication data is supplied to the communication data interfacing units.

Such a monitor device can display output display images from a plurality of computers at the same time. Moreover, the capability to alter the form of a superposed display on the monitor device from the computers enables the monitor device to adapt the display to the contents desired to be checked, and, accordingly, the monitor device can be used in practice as the monitor device for a plurality of computers.

If this monitor device is equipped with one or more input data interfacing units for entering input data from an input device, and an input data repeater for supplying, from one communication data interfacing unit to be dynamically selected out of the plurality of communication data interfacing units, input data to be entered into a computer which has entered inputs into the input data interfacing unit(s) to the computer carrying out inputting/outputting from/to this communication data interfacing unit, a specific input device can be used as the input device for a plurality of computers.

DESCRIPTION OF THE PREFERRED EMBODIMENT

A preferred embodiment of the present embodiment will be described below.

Figure 1:
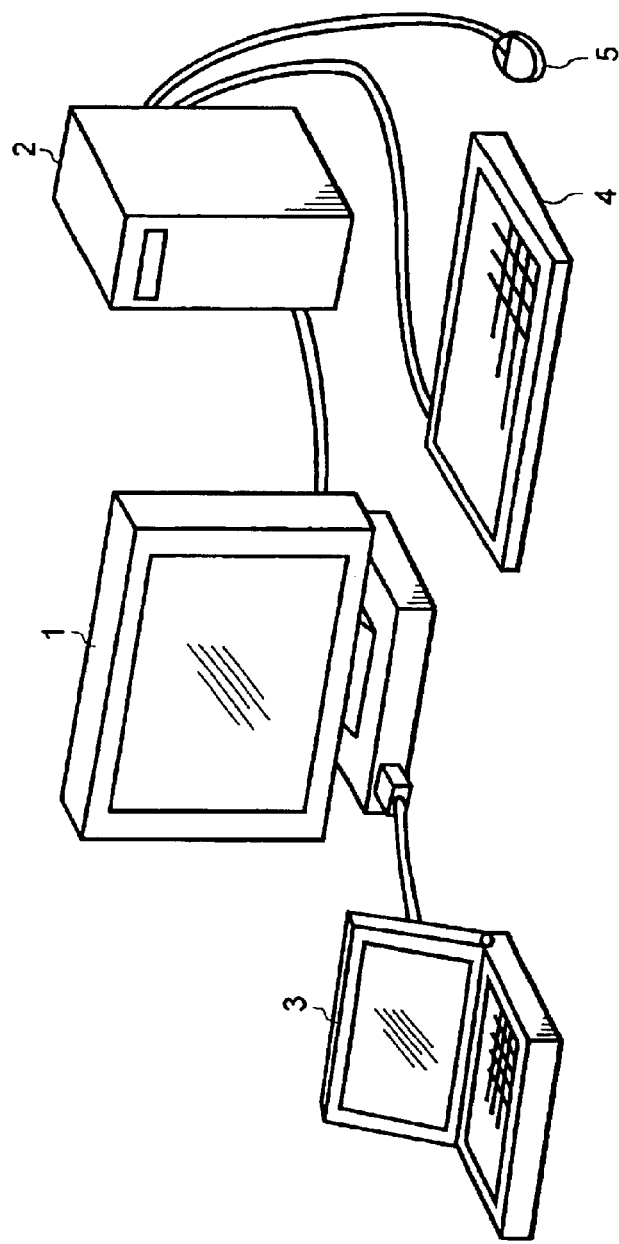
FIG. 1 is a perspective view of a multi-computer system to which the present invention is applied.

FIG. 1 illustrates a mode of use of a monitor device in a multi-computer system to which the present invention is applied.

In the figure, the system comprises a monitor device 1, a first computer (hereinafter "first PC") 2, and a second computer (hereinafter "second PC") 3. The first PC 2 is a stationary computer equipped with a keyboard 4 and a mouse 5 as input devices. The second PC 3 is a laptop type computer with its input devices, such as a keyboard and a pointing device, integrated into it.

Figure 2:
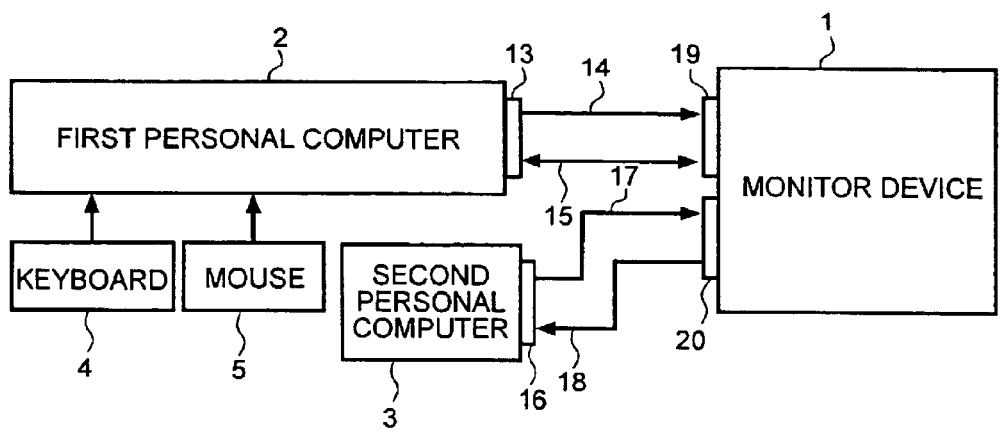
FIG. 2 is a block diagram showing the connective relationships between the monitor device and other units in the multi-computer system.

FIG. 2 illustrates the connective relationships of the monitor device 1 to the first PC 2 and the second PC 3.

In FIG. 2, a first PC connector 13 is fitted to the first PC 2 for providing a monitor connection, and a first monitor connector 19 is fitted to the monitor device 1 for the first PC connection. Between the first PC connector 13 and the first monitor connector 19, a first display data transmission line 14 is wired for transmitting first display data to the monitor device 1, which display data is supplied by the first PC 2, and a first communication data transmission line 15 is wired for transmitting and receiving communication data transferred between the first PC 2 and the monitor device 1.

Further, a second PC connector 16 is fitted to the second PC 3 for providing a monitor connection, and a second monitor connector 20 is fitted to the monitor device 1 for providing a second PC connection. Between the second PC connector 16 and the second monitor connector 20, a second display data transmission line 17 is wired for transmitting second display data to the monitor device 1, which display data is supplied by the second PC 3, and a second communication data transmission line 18 is wired for transmitting and receiving communication data transferred between the second PC 3 and the monitor device 1.

The following description will refer to a case in which both the first display data and the second display data, respectively sent from the first PC 2 and the second PC 3 to the monitor device 1, are display data for color display, including R, G and B color data, each of eight bits, transmitted in a low voltage differential signal (LVDS) system. In the case described below, both the first communication data transmission line 15 and the second communication data transmission line 18 are transmission lines for serial communication, known as universal serial buses (USB), though they may also be transmission lines for faster serial communication satisfying the IEEE 1394 standard, other lines for serial communication, or lines for parallel communication.

Figure 3:
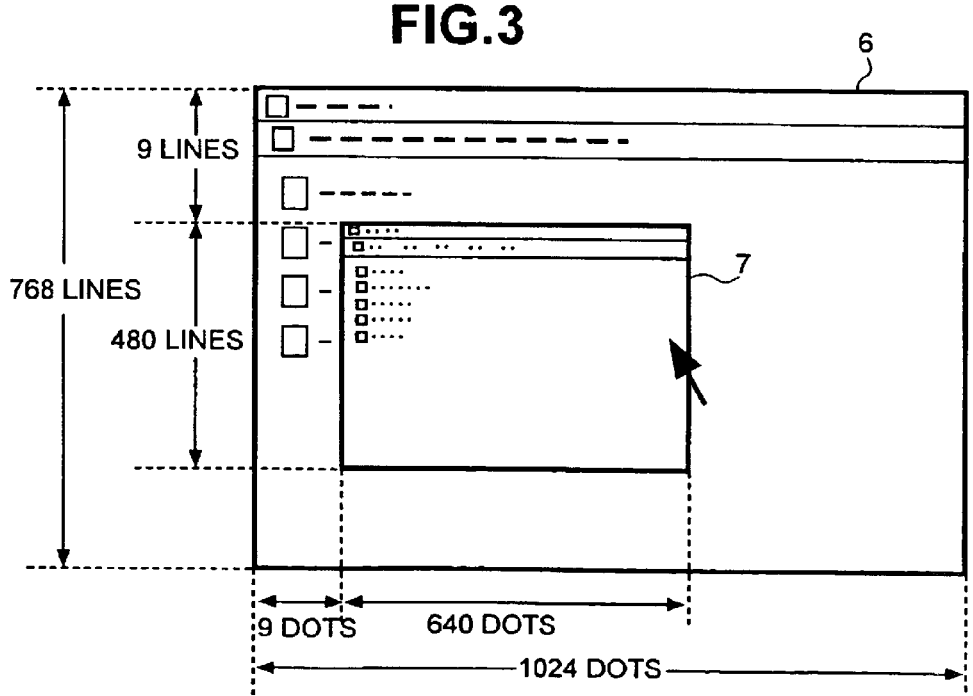
FIG. 3 is a diagram which illustrates an example of a display on the monitor device.

As illustrated in FIG. 3, it is possible to display a display image 7 corresponding to second display data from the second PC 3 within a display image 6 corresponding to first display data from the first PC 2 on the monitor device 1. It is further possible to alter the position and/or size of the display image 7 for the second PC 3 or the contrast, brightness and/or position adjustment of the display on the monitor device 1 from either the first PC 2 or the second PC 3. Communication between the first PC 2 and the second PC 3 via the monitor device 1 is also possible.

Figure 4:
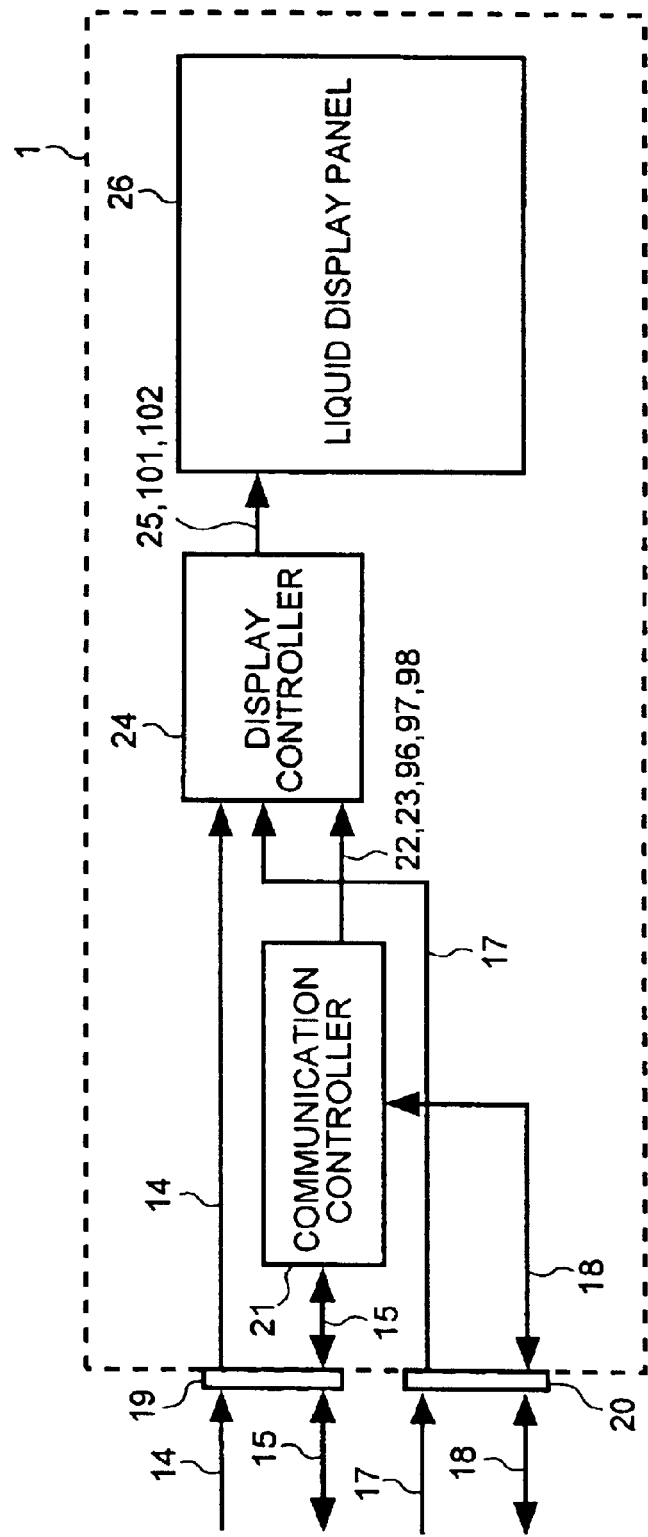
FIG. 4 is a block diagram of the monitor device.

The monitor device 1, which makes these actions possible, is illustrated in FIG. 4. In FIG. 4, the monitor device comprises a communication controller 21 which produces a second resolution signal 22 and a display position designation signal 23; a display controller 24 which produces liquid display data 25; and a liquid display panel 26.

Each unit will be described in detail below.

First, the operation of the communication controller 21 will be described.

Figure 5:
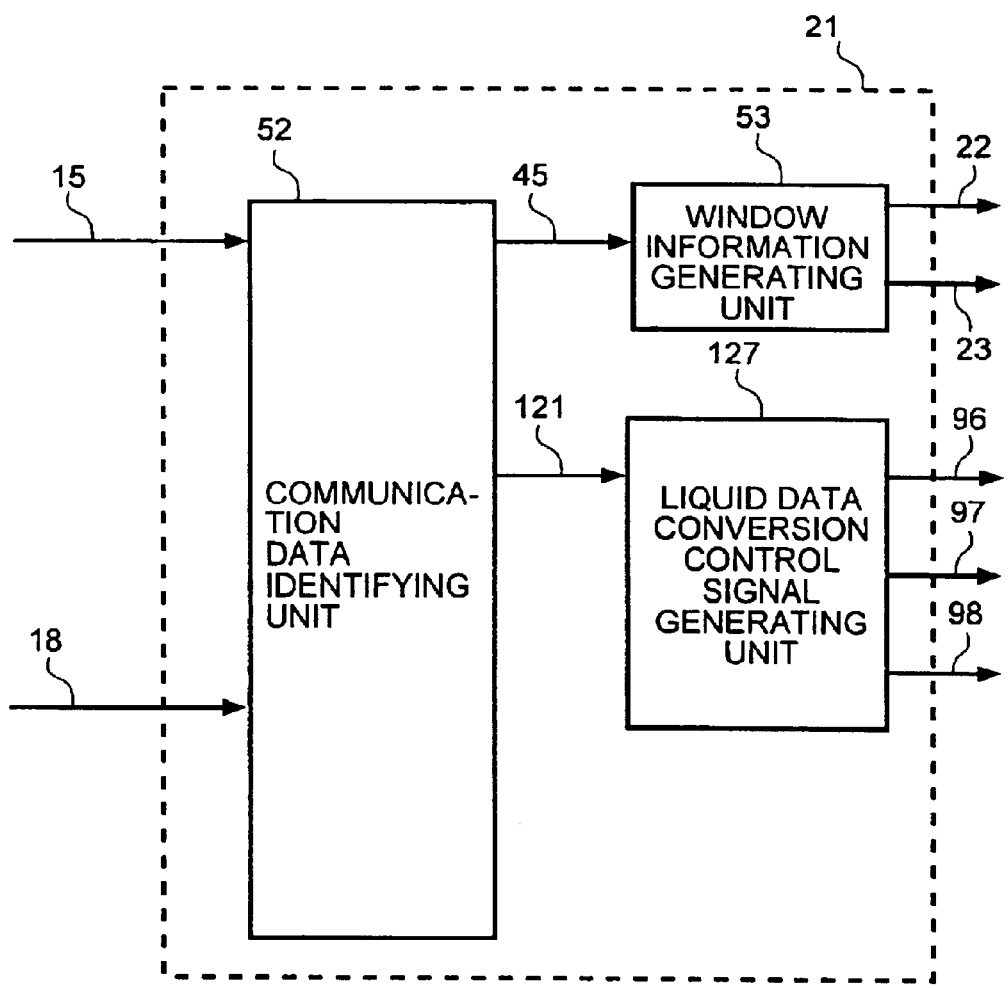
FIG. 5 is a block diagram of the communication controller of the monitor device.

FIG. 5 illustrates the configuration of the communication controller 21.

The communication controller 21 comprises a communication data identifying unit 52, a window information generating unit 53 and a liquid data conversion control signal generating unit 127.

Now, communication data sent from the first PC 2 via the first communication data transmission line 15 and the communication data sent from the second PC 3 via the second communication data transmission line 18 are sent to a communication data identifying unit 52. The communication data transmitted via the first communication data transmission line 15 and the second communication data transmission line 18 are augmented with the destination of the communication data when they are transmitted. To communication data whose destination is the monitor device 1 is added an identifier representing the contents of the communication data.

The contents of communication data to be transmitted by the first PC 2 or the second PC 3 to the monitor device 1 include information indicating the display position and/or the display size of the display image 7 on the second PC 3, and information indicating the contrast, brightness and/or position adjustment quantity of the display on the monitor device 1. These communication data, in a state wherein a predetermined unique identifier is added to it, are entered into the communication data identifying unit 52.

The communication data identifying unit 52, when it determines that the destination of the communication data received from the first PC 2 via the first communication data transmission line 15 is the second PC 3, transmits the data as is to the second PC 3 via the second communication data transmission line 18. Or, if the destination of communication data received from the second PC 3 via the second communication data transmission line 18 is the first PC 2, the unit transmits the data as is to the first PC 2 via the first communication data transmission line 15.

This makes possible communication between the first PC 2 and the second PC 3 via the monitor device 1.

On the other hand, if the destination of communication data received from the first PC 2 via the first communication data transmission line 15 is the monitor device 1, or if the destination of communication data received from the second PC 3 via the second communication data transmission line 18 is the monitor device 1, the identifier representing the contents is discerned, and information indicating the display position and/or the display size of the display image 7 on the second PC 3 is transferred to the window information generating unit 53 via line 45, or information indicating the contrast, brightness and/or position adjustment quantity of the display on the monitor device 1 is transferred to the liquid data conversion control signal generating unit 127 via line 121.

The window information generating unit 53, in response to the received information indicating the display position and/or the display size, supplies the display controller 24 with a second resolution signal 22 representing the magnitude (resolution) of the display image of the second PC 3 and a display position signal 23 indicating the display position and the presence or absence of display. Incidentally, information indicating the display position and/or the display size of the display image 7 on the second PC 3, sent from either the first PC 2 or the second PC 3, consists of an indication the presence or absence of display, information on the top left coordinates of the display image of the second PC 3, and information on the number of lines in the vertical direction and the number of dots in the horizontal direction.

The window information generating unit 53 supplies as the display position signal 23 a single bit signal which is "0" when the scanning position of the monitor device 1 is in a position in which the display image 7 of the second PC 3 is not displayed, or "1" when it is in a position in which the display image 7 of the second PC 3 is displayed. Further the window information generating unit 53 supplies as the resolution signal 22 a signal representing the number of dots in the horizontal direction in 10 bits and the number of dots in the vertical direction in 10 bits. Thus, as shown in FIG. 3, if a frame on the monitor device 1 consists of 1024×768 dots and the display image 7 on the second PC 3 consists of 640×480 dots and is to be displayed from the 10th dot in the horizontal direction and the 10th line in the vertical direction, the display position signal 23 will be "1" from the 10th to 489th lines in the vertical direction while the monitor device 1 is scanning the 10th to 649th dots in the horizontal direction, and the resolution signal 22 will be a signal indicating 640 dots in the horizontal direction and 480 dots in the vertical direction.

On the other hand, the liquid data conversion control signal generating unit 127, in response to the received information indicating the contrast, brightness and/or position adjustment quantity of the display, supplies the display controller 24 with a display position control signal 96 representing the position adjustment quantity of the display of the monitor device 1, a display contrast control signal 97 designating the contrast of the display of the monitor device 1, and a display brightness control signal 98 designating the brightness of the display of the monitor device 1.

Next, details of the display controller 24 will be described.

Figure 6:
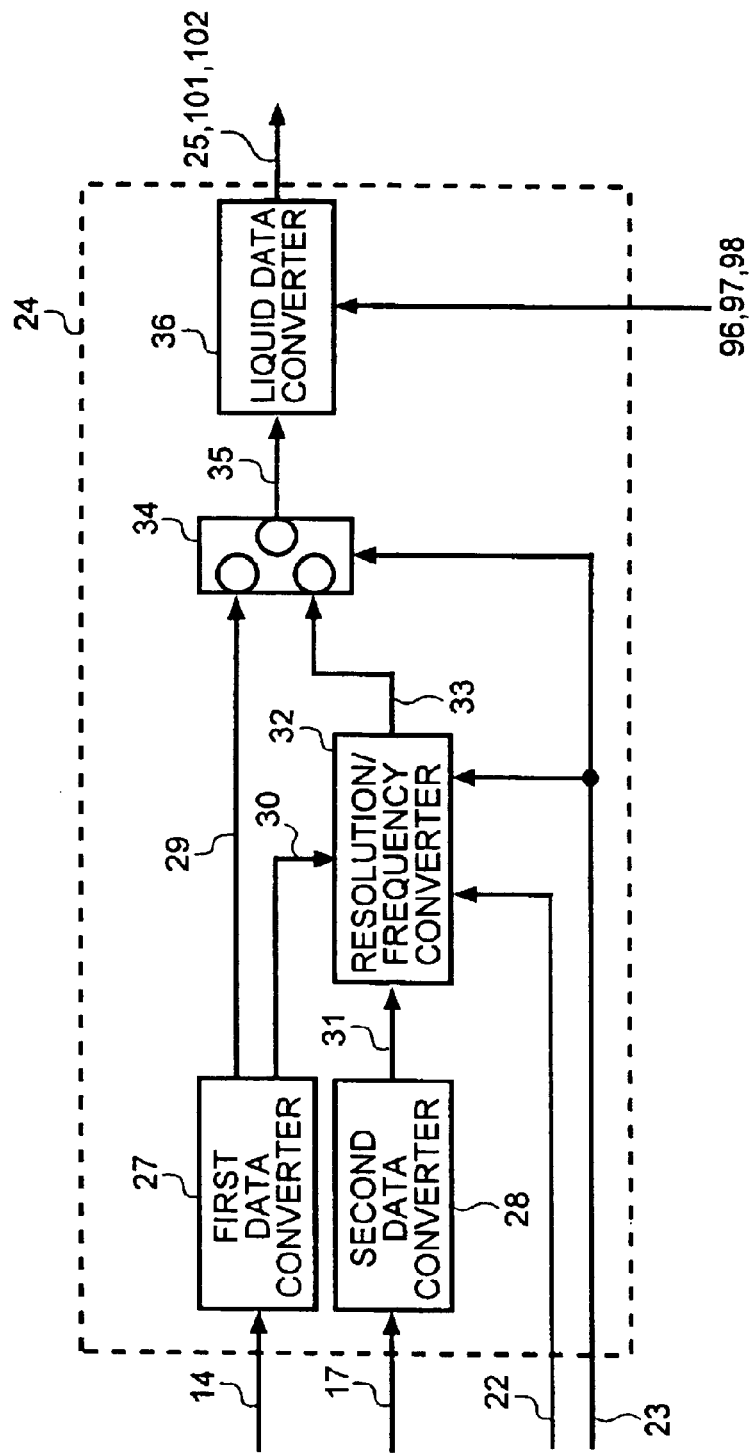
FIG. 6 is a block diagram of the display controller of the monitor device.

FIG. 6 illustrates the configuration of the display controller 24.

In the figure, the display controller comprises a first data converter 27, which outputs first parallel data 29 and a first sync signal 30; a second data converter 28 which outputs second parallel data 31; a resolution/frequency converter 32, which outputs window display parallel data 33; a data selector 34, which outputs superposed display data 35; and a liquid data converter 36.

The first data converter 27 converts first display data, which comprises LVDS signals received via the first display data transmission line 14, into display data of R (red), G (green) and B (blue), a vertical sync signal, a horizontal sync signal, a display effective period signal, and a dot clock signal, and supplies this data and signals to the data selector 34 as first parallel data 29. It also supplies the resolution/frequency converter 32 with the vertical sync signal, the horizontal sync signal and the dot clock signal as first sync signals 30.

The second data converter 28, like the first data converter 27, converts second display data, which comprises LVDS signals entered via the second display data transmission line 17, into display data of R (red), G (green) and B (blue), a vertical sync signal, a horizontal sync signal, a display effective period signal, and a dot clock signal, and supplies this data and signals to the data selector 34 as second parallel data 31.

Here, display data contained in the first parallel data 29 and the second parallel data 31 are supposed to be display data of eight bits each of RGB (16.7 million color-display).

The resolution/frequency converter 32 subjects the second parallel data 31 to resolution conversion in accordance with the resolution signal 22 and to frequency conversion so as to equalize their frequency to that of the first parallel data 29 in accordance with the first sync signal 30. Then it supplies the converted data as window display parallel data 33.

Figure 7:
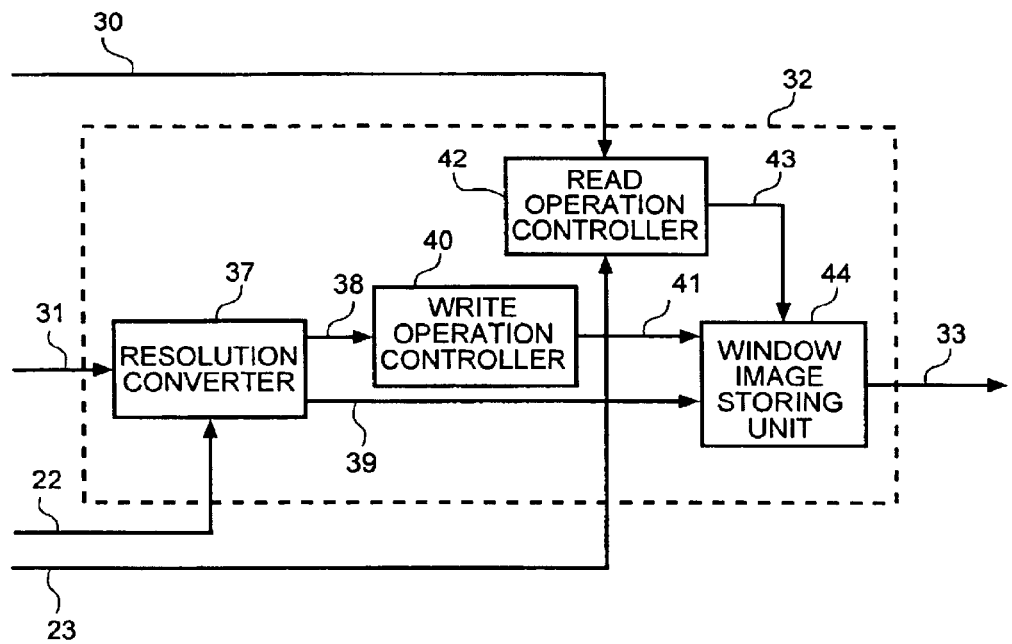
FIG. 7 is a block diagram illustrating the configuration of the resolution/frequency converter of the monitor device.

The resolution/frequency converter 32 is configured as illustrated in FIG. 7.

In the figure, the converter 32 comprises a resolution converter 37, which produces a resolution-converted sync signal 38 and resolution-converted display data 30; a write operation controller 40, which produces a write operation control signal 41; a read operation controller 42, which produces a read operation control signal 43; and a window image storing unit 44.

The resolution converter 37 subjects the second parallel data 31 to resolution conversion in accordance with the resolution indicated by the resolution signal 22, and supplies the converted data as resolution-converted display data 39 together with the resolution-converted vertical sync signal, the horizontal sync signal, and the resolution-converted sync signal 38, which is a dot clock signal. The write operation controller 40, on the basis of the resolution-converted sync signal 38, generates the write operation control signal 41, which is a timing signal for temporarily storing the resolution-converted display data 39 into the window image storing unit 44.

The read operation controller 42, in order to display the display image 7 on the second PC 3 within the display image 6 on the first PC 2, generates the read operation control signal 43 for reading the resolution-converted display data 39 from the window image storing unit 44 as the window display parallel data 33 to match the display position of the display image 7 on the second PC 3 according to the first sync signal 30, which is a sync signal out of the first parallel data 29, and the display position signal 23. The window image storing unit 44, in accordance with the write operation control signal 41, stores a single frame equivalent of the resolution-converted display data 39, and supplies it as the window display parallel data 33 in accordance with the read operation control signal 43.

Referring back to FIG. 6, the data selector 34, in accordance with the display position signal 23, switches the first parallel data 29 and the window display parallel data 33 so as to supply the window display parallel data 33 at the display timing of the display image 7 of the second PC 3, and supplies the data as the superposed display data 35. Here it supplies the first parallel data 29 when the display position signal 23 is "0" or the window display parallel data 33 when the signal is "1".

The liquid data converter 36 converts the superposed display data 35 consisting of parallel RGB data of eight bits each into input signals for the liquid crystal display 26, and supplies this data as the liquid crystal display data 25.

Figure 8:
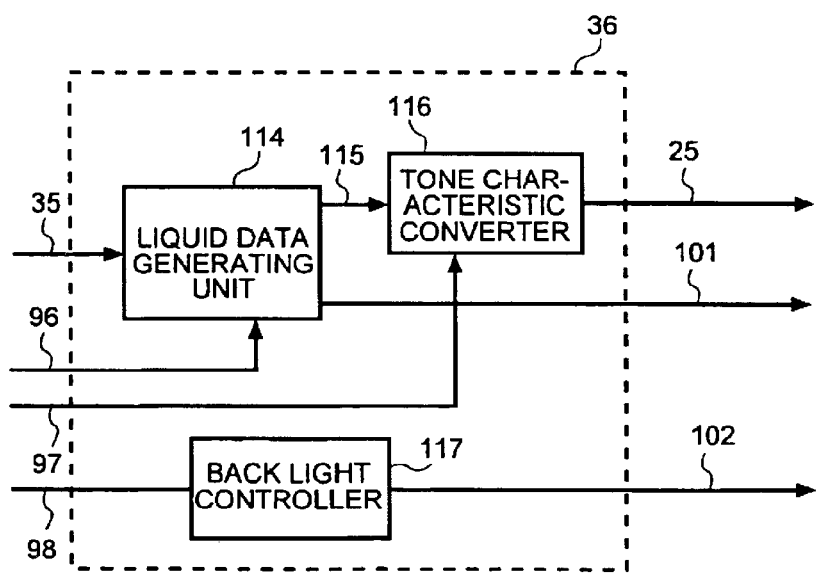
FIG. 8 is a block diagram of the liquid data converter of the monitor device.

FIG. 8 illustrates the configuration of this liquid data converter.

In the figure, the converter 36 comprises a liquid data generator 114, which outputs unadjusted liquid crystal display data 115; a tone characteristic converter 116; and a back light controller 117.

The liquid data generator 114 converts the superposed display data 35, consisting of the parallel RGB data of eight bits each and the sync signal, at the display timing of the liquid crystal display 26. It supplies this data as the unadjusted liquid crystal display data 115 and the liquid crystal display sync signal 101, and, at the same time, it controls the liquid crystal display sync signal 101 so as to coordinate it with the display position of the whole frame in accordance with the display position control signal 96. The tone characteristic converter 116, in order to adjust the display contrast, converts the tone characteristic of the unadjusted liquid crystal display data 115 in accordance with the display contrast control signal 97, and it supplies the converted data as the liquid crystal display data 25. If it is desired, for instance, to increase the contrast, the RGB data of eight bits each are converted so as to maximize the difference between the highest brightness and the lowest brightness; or, if, conversely, it is desired to decrease the contrast, the RGB data of eight bits each are converted so as to reduce the data of the highest brightness or to enhance the data of the lowest brightness. The back light controller 117, in accordance with the display brightness control signal 98, generates a liquid crystal panel back light control signal 102 for controlling the back light of the liquid crystal display 103.

As described above, it is possible to display the display image 7 of the second PC 3 in the display image 6 of the first PC 2 on the monitor device 1. It is also possible to alter, from either the first PC 2 or the second PC 3, the position and/or size of the display image 7 on the second PC 3 or the contrast, brightness and/or position adjustment of the display on the monitor device 1.

Now, altering the position and/or size of the display image 7 of the second PC 3 or the contrast, brightness and/or position adjustment of the display on the monitor device 1 from either the first PC 2 or the second PC 3 is accomplished in the following manner. It can be accomplished by, for instance, causing driver software controlling the monitor device 1 operating on either the first PC 2 or the second PC 3 to send instructions from the user to the monitor device 1 as described above.

Or else, altering the position and/or size of the display image 7 on the second PC 3 is accomplished, for instance, by managing the position and/or size of the display image 7 on the second PC 3, accepting the desired changes according to the manipulation of the mouse 3 by the user, and sending the pertinent instructions to the monitor device 1 as described above. Alternatively, it can also be accomplished by causing software working in coordination with the OS of the first PC 2 to operate on the first PC 2 In this case, this software accepts any change in the position and/or size of the display image 7 on the second PC 3 in response to the dragging of the mouse 3.

Thus, if the title bar position of the display image 7 on the second PC 3 is dragged, a position change will be accepted, or if the bottom right corner of the display image 7 on the second PC 3 is dragged, a size change will be accepted.

The monitor device 1 so far described enables the user to accomplish file transfers among other things from the first PC 2 to the second PC 3 or vice versa by using communication software working on the first PC 2 or the second PC 3 while watching the display on the monitor device 1. The user is also enabled to exchange directory information or display information between the first PC 2 and the second PC 3 and to cause the two PCs to operate in a coordinate manner. For instance, the user may manipulate the mouse 3 to accomplish file drag-and-drop displaying between the display image 7 on the second PC 3 and the display image 6 on the first PC 2, together with a file transfer between the first PC 2 and the second PC 3 interlocked with the file drag-and-drop displaying operation.

Incidentally, while the display data sent from the first PC 2 and the second PC 3 are supposed to be LVDS signals in this embodiment, other forms of display data may be used if the monitor device 1 is provided with an appropriate interface.

Next, another mode of the use of the monitor device will be described with reference to FIG. 9.

Figure 9:
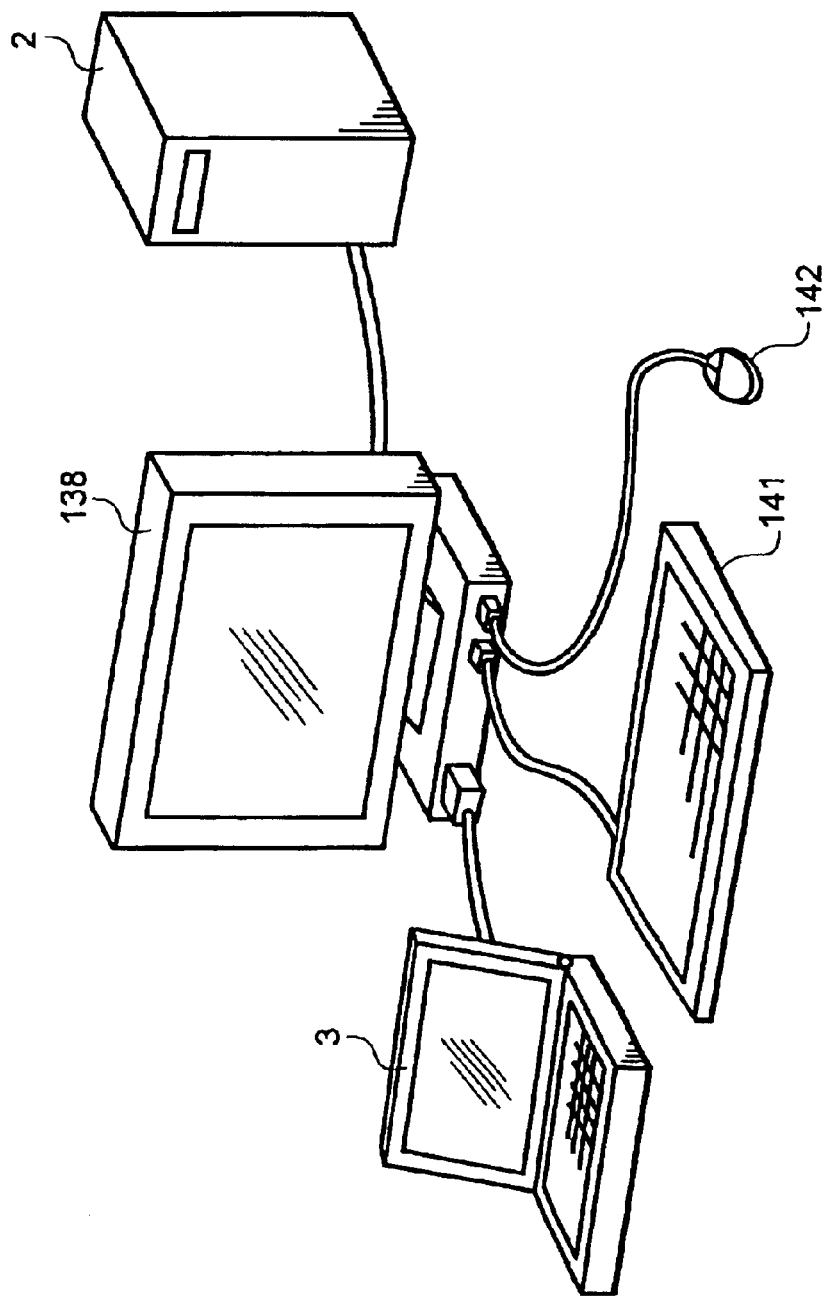
FIG. 9 is a perspective view of another of the multi-computer system to which the present invention is applied.

As shown in FIG. 9, a keyboard 141 and a mouse 142 are connected to a monitor device 138.

Figure 10:
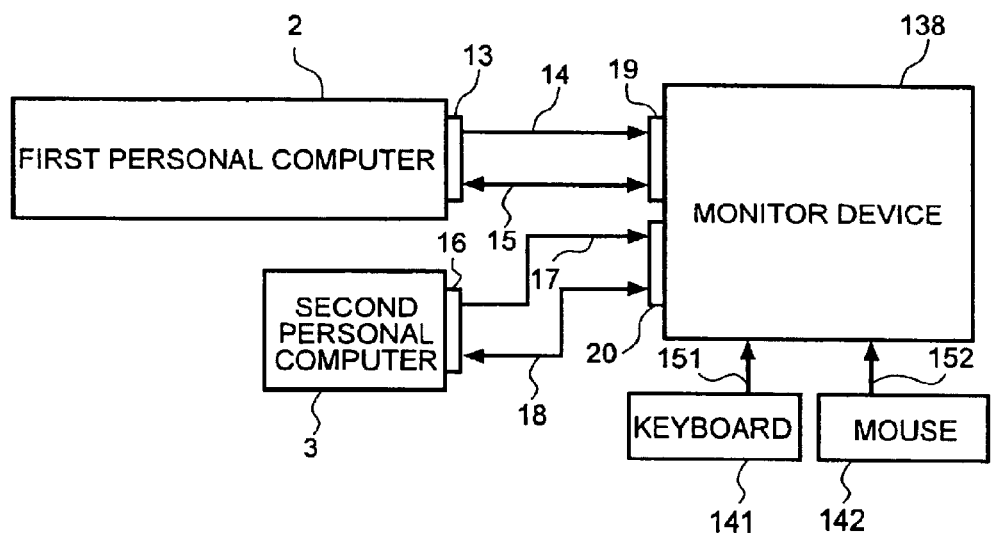
FIG. 10 is a block diagram showing the connective relationships between the monitor device and other units in the multi-computer system.

FIG. 10 illustrates the connective relationships of the monitor device 138 to the first PC 2, the second PC 3, the keyboard 141 and the mouse 142.

As illustrated, the connections of the monitor device 138 to the first PC 2 and the second PC 3 are similar to the corresponding connections shown in FIG. 1. Note should be taken of the fact that, in FIG. 10, the monitor device 138 is connected directly to the keyboard 141 and to the mouse 142 respectively by way of a keyboard input signal transmission line 151 and a mouse input signal transmission line 152, each fitted to the monitor device 138 via a connector. Both the keyboard input signal transmission line 151 and the mouse input signal transmission line 152, like the first communication data transmission line 15 and the second communication transmission line 18, consist of a USB.

Now, in the configuration of FIG. 9, in addition to the actions described with reference to FIG. 1, the keyboard 141 and the mouse 142 connected to the monitor device 138 can be used as input devices for the first PC 2 and the second PC 3. Furthermore, the contrast, brightness and/or position adjustment of the display on the monitor device 138 can be altered from the keyboard 141.

Figure 11:
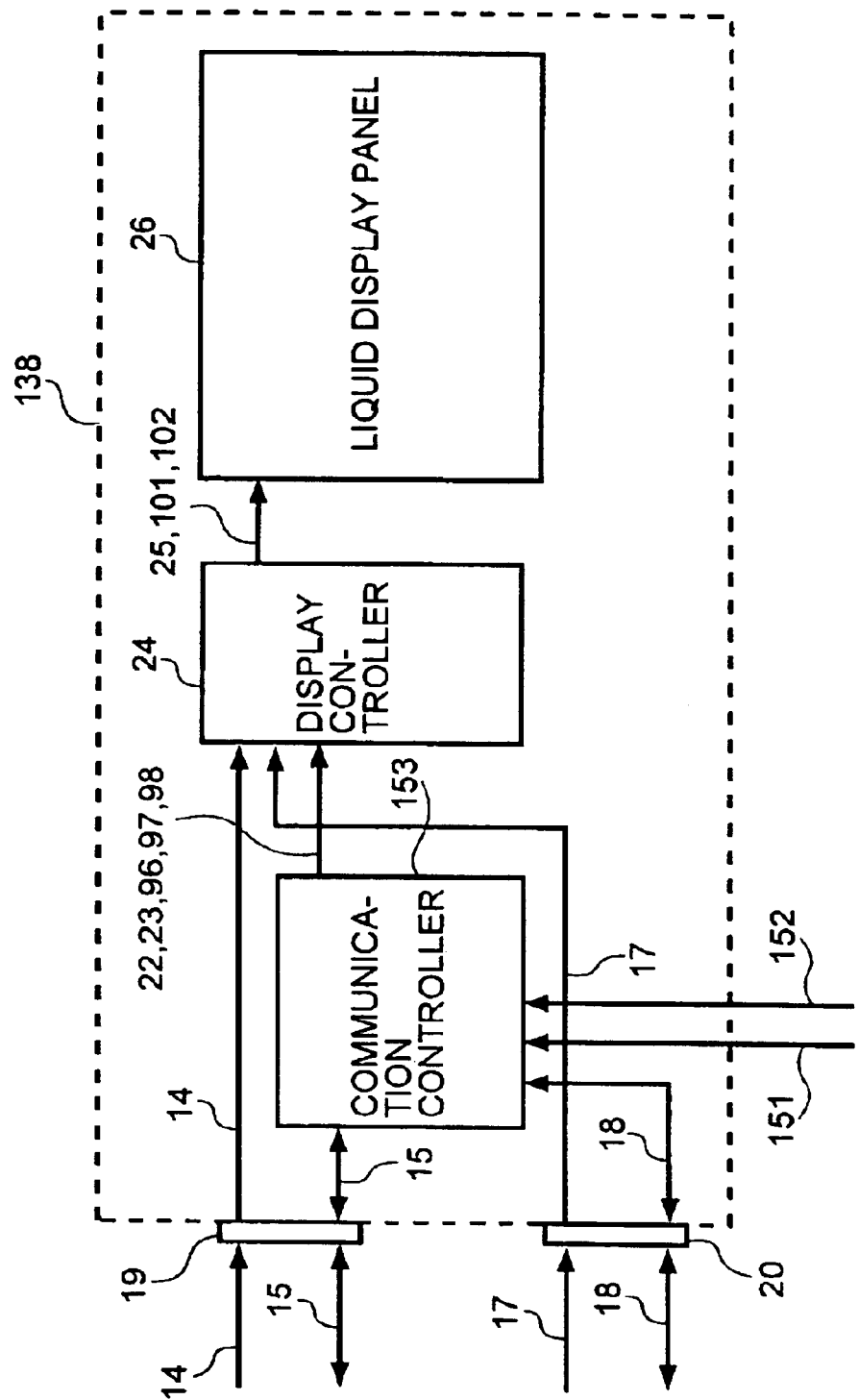
FIG. 11 is a block diagram of the monitor device.

FIG. 11 shows the configuration of the monitor device 138 which makes such operations possible.

As illustrated, the configuration of the monitor device 138 differs from the monitor device 1 in FIG. 1 in that the keyboard input signal transmission line 151 and the mouse input signal transmission line 152 are connected to the communication controller 153. The monitor device 138 also differs from the monitor device 1 in FIG. 4 in the configuration and actions of the communication controller 153.

Therefore, details of this communication controller 153 will be described below.

Figure 12:
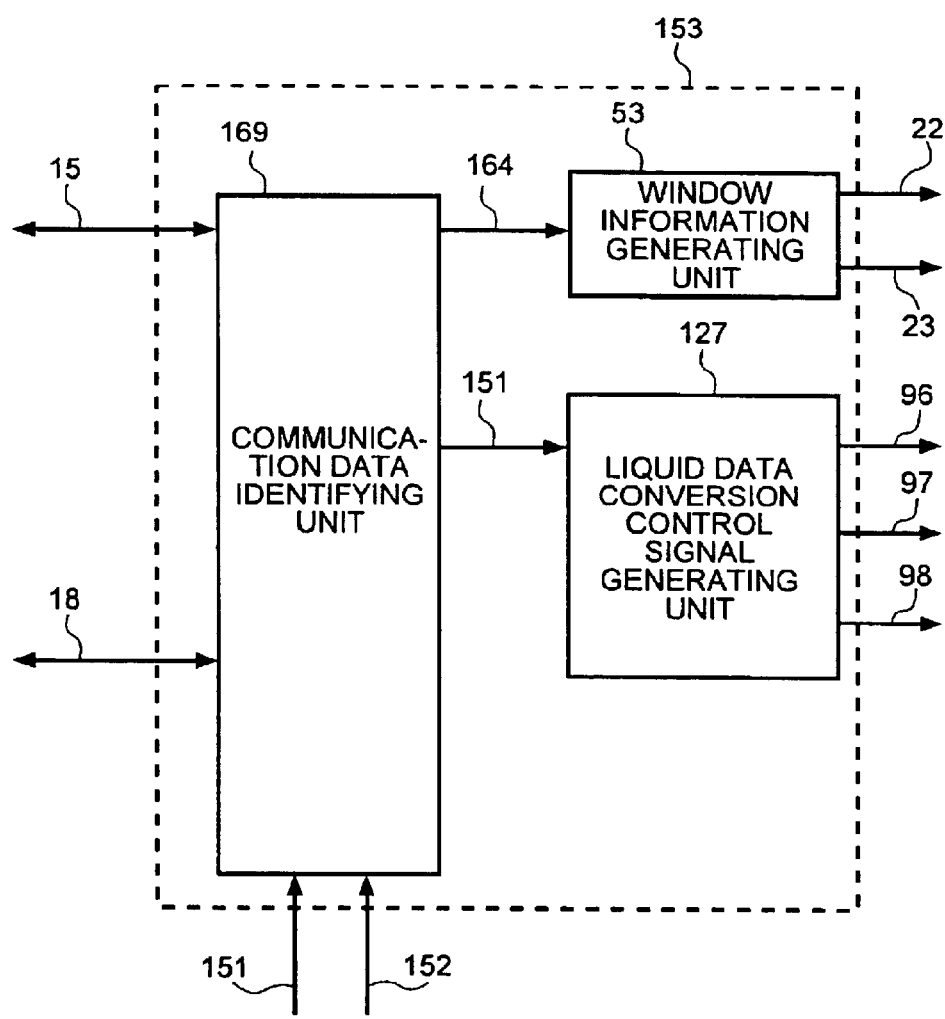
FIG. 12 is a block diagram of the communication controller of the monitor device.

FIG. 12 illustrates the configuration of the communication controller 153.

As illustrated, the communication controller 153, like the communication controller 21 in FIG. 4, comprises a communication data identifying unit 169, a window information generating unit 53 and a liquid data conversion control signal generating unit 127.

Here, communication data sent from the first PC 2 via the first communication data transmission line 15, communication data sent from the second PC 3 via the second communication data transmission line 18, keyboard input signals sent from the keyboard 141 via the keyboard input signal transmission line 151, and mouse input signals sent from the mouse 142 via the mouse input signal transmission line 152 are sent to the communication data identifying unit 169.

Now, the operations of the window information generating unit 53 and the liquid data conversion control signal generating unit 127 are similar to those of the communication controller in FIG. 4. Also, the communication controller 153 operates in the same way as the communication controller 21 in FIG. 4 except in the following respects.

For some specific key manipulations of the keyboard 141, input device output PC switching, display contrast alteration for the monitor device 138, display brightness alteration for the monitor device 138, and display position adjustment alteration for the monitor device 138 are allocated in advance.

Then, the communication data identifying unit 169 is so disposed as to monitor, at all times, keyboard input signals sent from the keyboard 141 via the keyboard input signal transmission line 151. Keyboard input signals representing other key manipulations than the aforementioned specific ones are either sent to the first PC 2 via the first communication data transmission line 15 as communication data or to the second PC 3 via the second communication data transmission line 18 as communication data. The PC to transmit the keyboard input signals is switched when a key manipulation to switch the input device output PC is detected. Further, the communication data identifying unit 169 transmits mouse input signals sent from the mouse 142 via the mouse input signal transmission line 152 to the PC transmitting the keyboard input signal via the first communication data transmission line 15 or the second communication data transmission line 18 as communication data.

The keyboard 141 and the mouse 142 connected to the monitor device 138 are thereby enabled to be used as input devices for both the first PC 2 and the second PC 3.

Further, the communication data identifying unit 169, when it has detected a specific key manipulation for display contrast alteration for the monitor device 138, display brightness alteration for the monitor device 138, or display position adjustment alteration for the monitor device 138, hands over the content of the alteration represented by that key manipulation to the liquid data conversion control signal generating unit 127.

It is thereby made possible to alter the display from the keyboard 141 connected to the monitor device 138.

Incidentally, it may also be so disposed as to permit position and size alteration of the display image 7 on the second PC 3 similar to alteration of the contrast, brightness and/or position adjustment of the display on the monitor device 138. Also, as the mouse 142 is connected to the monitor device 138, it may be so arranged as to have the monitor device 138 manage the position and size of the display image 7 on the second PC 3 and to accept their alteration according to the user's manipulation of the mouse 142. In this case, the monitor device 138 accepts alteration of the position and size of the display image 7 on the second PC 3 in response to the dragging of the mouse 3. Thus, when it has detected dragging of the title bar position of the display image 7 on the second PC 3, it alters the position of the display image 7 on the second PC 3 instead of sending the content of the manipulation to the first PC 2 or the second PC 3, or when it has detected dragging of the right bottom corner of the display image 7, it alters the size of the display image 7 on the second PC 3 instead of sending the content of the manipulation to the first PC 2 or the second PC 3.

Figure 13:
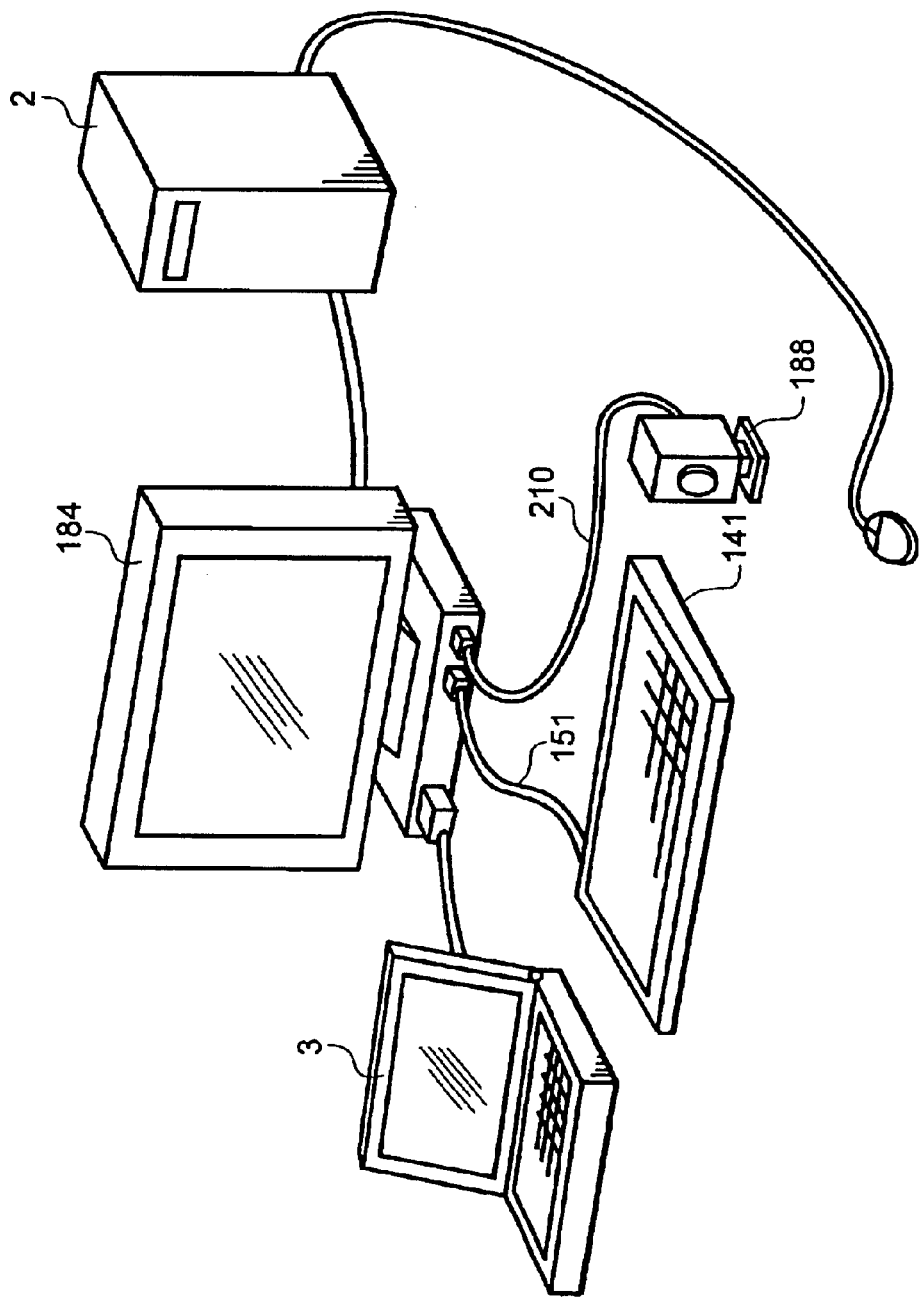
FIG. 13 is a perspective view of still another embodiment of the multi-computer system to which the present invention is applied.

FIG. 13 illustrates still another mode of use of the monitor device.

As illustrated, the keyboard 141 and a camera 188 are connected to a monitor device 184, and the mouse 5 is connected to the first PC 2.

Figure 14:
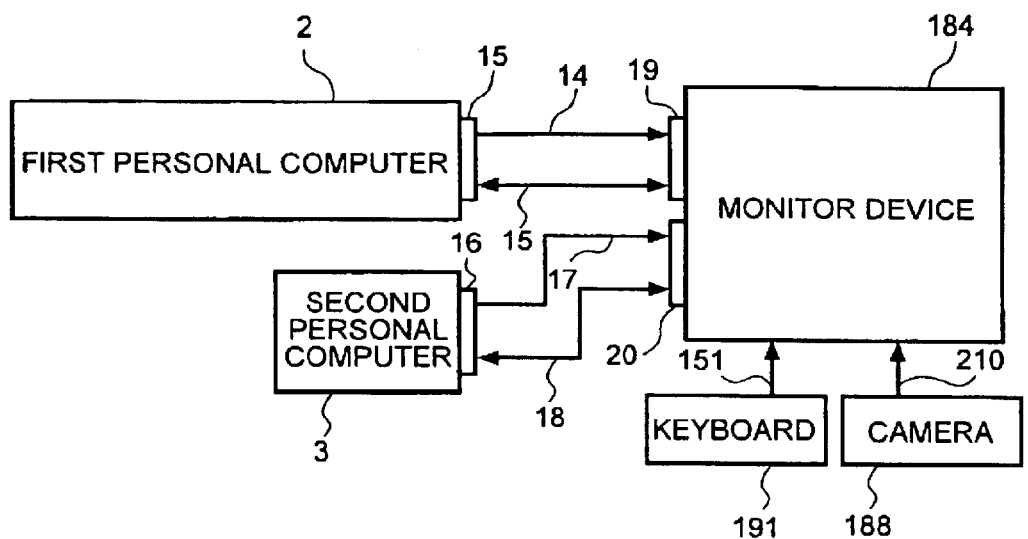
FIG. 14 is a block diagram showing the connective relationships between the monitor device and other units in the multi-computer system.

The connective relationships of the monitor device 184 to the first PC 2, the second PC 3, the keyboard 141 and the mouse 142 are shown in FIG. 14.

As illustrated, the connections of the monitor device 184 to the first PC 2 and the second PC 3 are similar to the corresponding connections shown in FIG. 9. In the mode of use illustrated in FIG. 13, the monitor device 184 is connected to the keyboard 141 and to the camera 188, respectively, by the keyboard input signal transmission line 151 and a camera input signal transmission line 210. Both the keyboard input signal transmission line 151 and the camera input signal transmission line 210, like the first communication data transmission line 15 and the second communication transmission line 18, consist of a USB.

Figure 15:
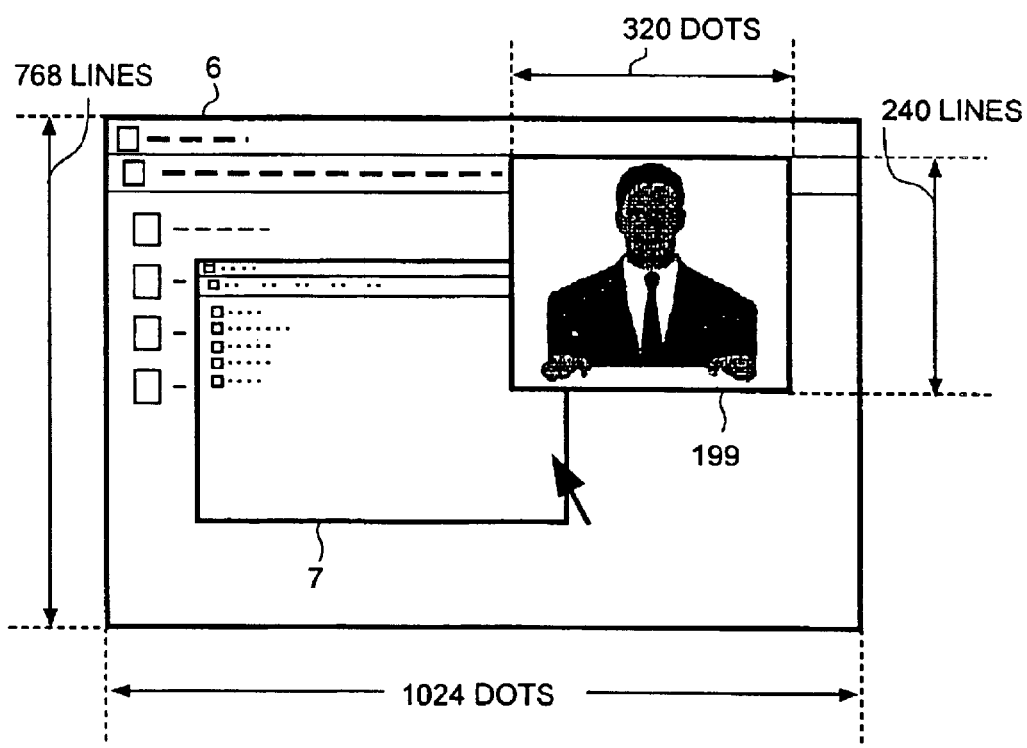
FIG. 15 is a diagram which illustrates an example of a display on the monitor device.

As shown in FIG. 15, an image represented by camera input signals from the camera 188 connected to the monitor device 184 can be displayed within the display image 6 of the first PC 2 displayed on the monitor device 184 as the display image 191 of the camera.

Figure 16:
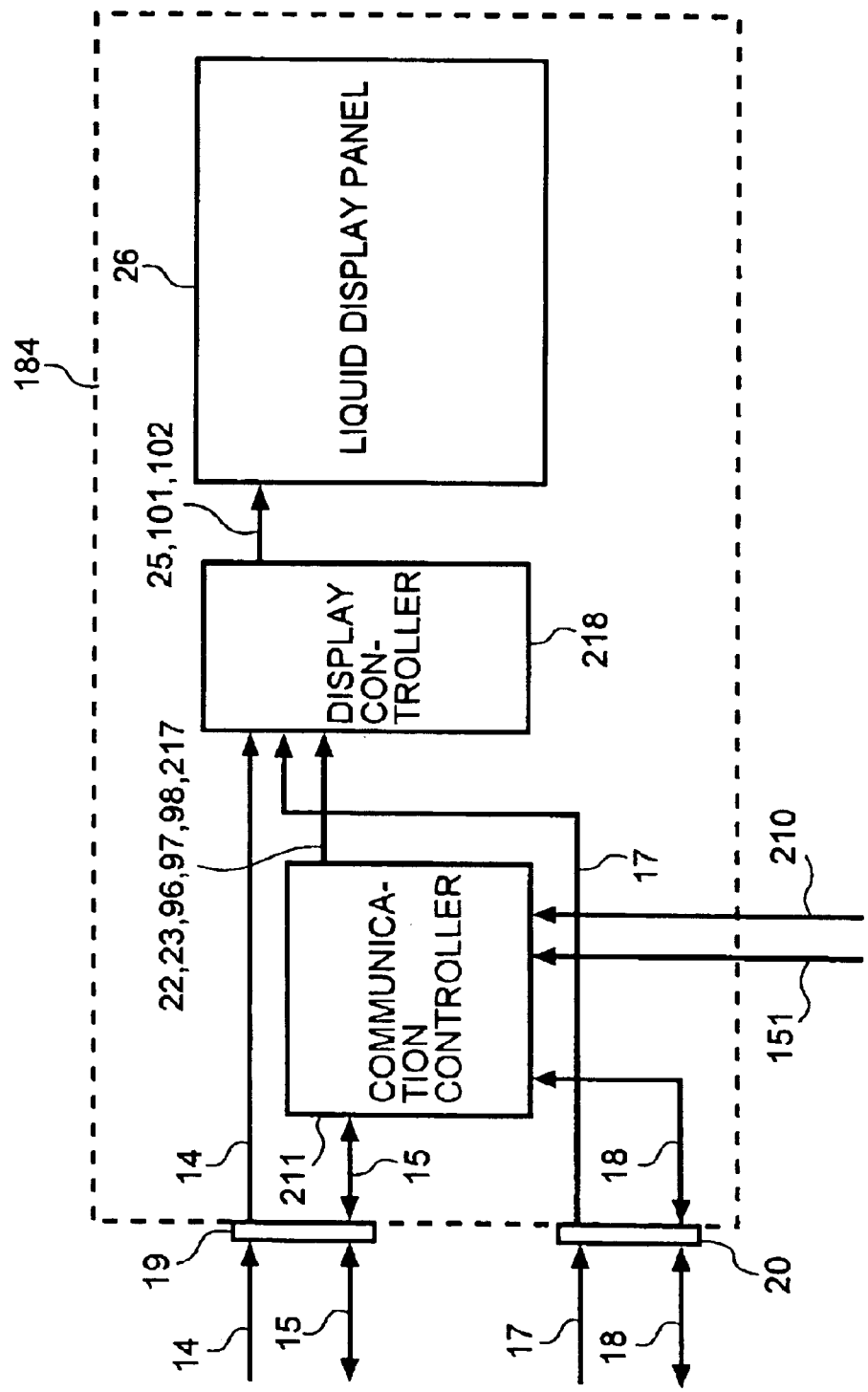
FIG. 16 is a block diagram of the monitor device.

FIG. 16 illustrates the configuration of the monitor device 184 which makes such actions possible.

As shown in FIG. 16, the configuration of the monitor device 184 features the connection of the keyboard input signal transmission line 151 and the camera input signal transmission line 210 to the communication controller 211. As a result, the monitor device 184 is characterized by the configurations and actions of the communication controller 211 and the display controller 218.

First, details of the communication controller 211 will be described.

Figure 17:
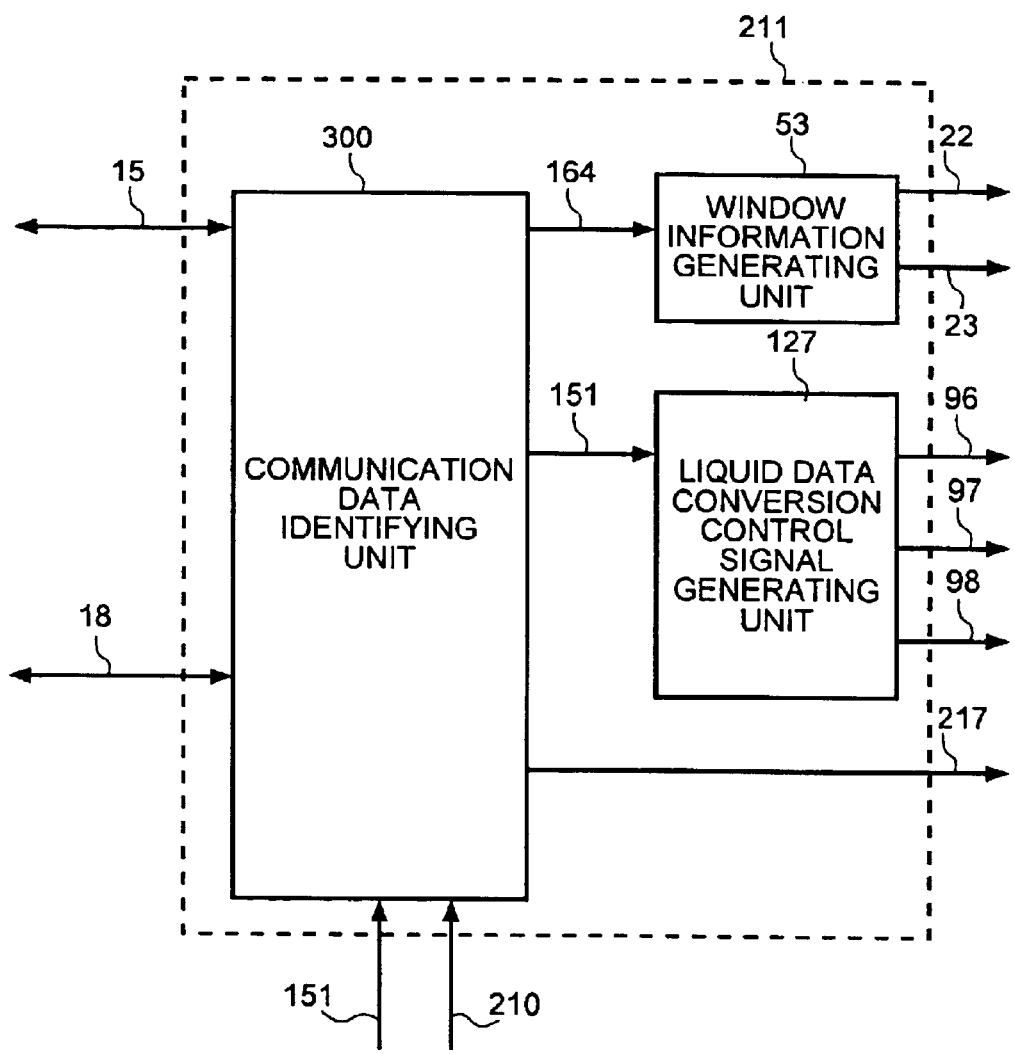
FIG. 17 is a block diagram of the communication controller of the monitor device.

FIG. 17 illustrates the configuration of the communication controller 211.

As illustrated, the communication controller 211, like the configuration shown in FIG. 5, comprises a communication data identifying unit 300, the window information generating unit 53 and the liquid data conversion control signal generating unit 127.

Here, communication data sent from the first PC 2 via the first communication data transmission line 15, communication data sent from the second PC 3 via the second communication data transmission line 18, keyboard input signals sent from the keyboard 141 via the keyboard input signal transmission line 151, and camera input signals sent from the camera 188 via the camera input signal transmission line 210 are inputted to the communication data identifying unit 300.

The operations of the window information generating unit 53 and of the liquid data conversion control signal generating unit 127 are similar to those described above with reference to FIG. 5. Also, the operations of the communication controller 211 are the same as those of the communication controller 21 shown in FIG. 5 except in the following respects.

Thus, the communication data identifying unit 300 processes keyboard input signals sent from the keyboard 141 via the keyboard input signal transmission line 151 in the same manner as described with reference to FIG. 12. This enables the keyboard 141 connected to the monitor device 184 to be used as the input device for the first PC 2 and the second PC 3.

Also the communication data identifying unit 300 sends camera input signals, sent from the camera 188 via the camera input signal transmission line 210, to the display controller 218 as camera display data 217.

Next details of the display controller 218 will be described.

Figure 18:
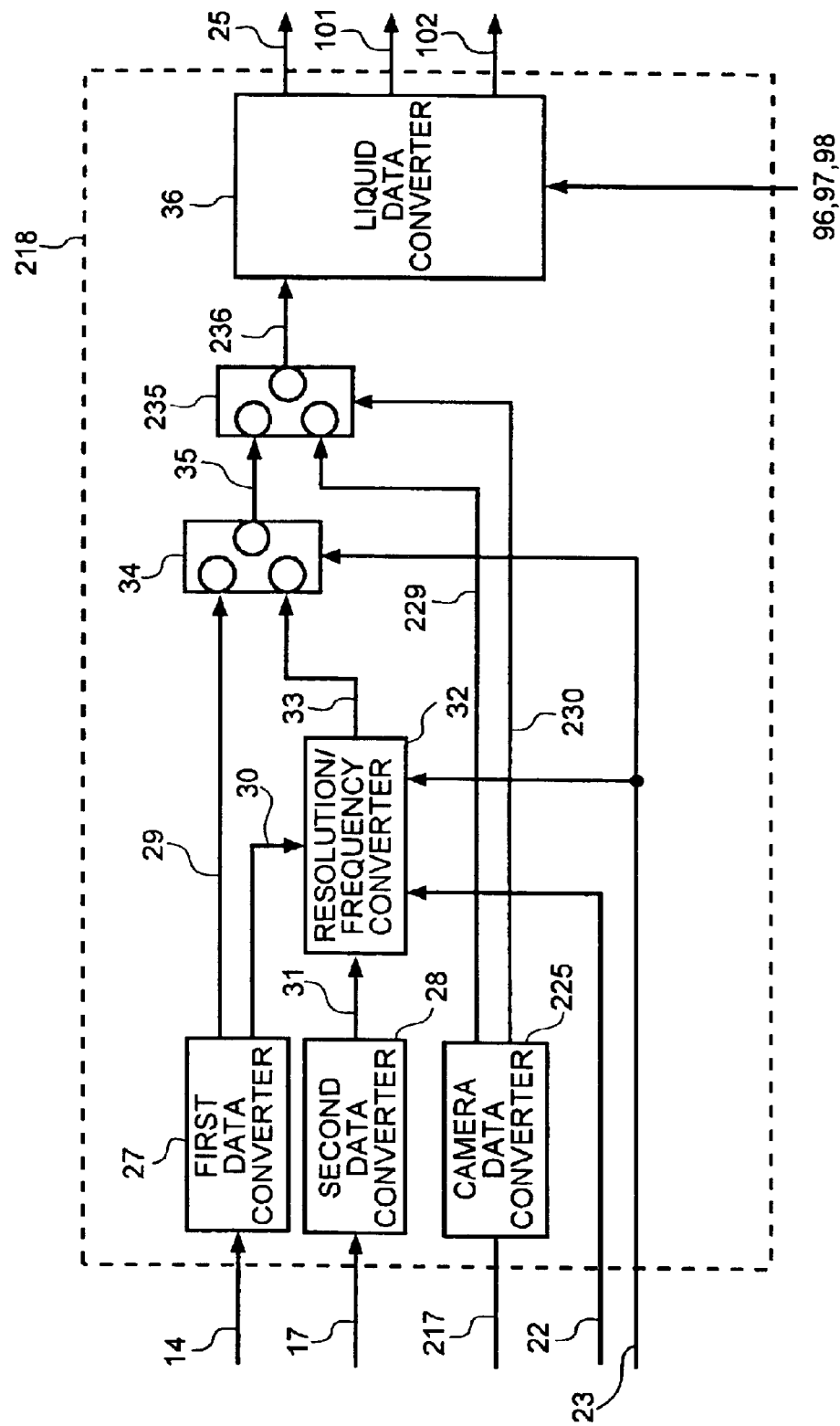
FIG. 18 is a block diagram of the display controller of the monitor device.

FIG. 18 illustrates the configuration of the display controller 218.

As illustrated, in the display controller 218, a camera data converter 225 and a camera data selector 235 are added to the display controller 24 of FIG. 6.

The camera data converter 225 converts the camera display data 217, which is serial data, into camera display parallel data 229, which is parallel data like the superposed display data 35. Along with this conversion, it generates a camera display position instructing signal 230 for instructing what part of the liquid crystal display 222 a camera image displayed position 199 should be displayed in.

The reference display position for the camera image display position 199 here is presumed to be a position set in the camera data converter 225 in advance, and with the size of the camera image display position 199 matching the resolution of the camera display data 217, the camera data converter 225 generates the camera display position instructing signal 230. For instance, FIG. 15 illustrates a case in which the resolution of the camera display data 217 is 320×240 dots, and in this instance the sizes of the camera image display position 199 in the horizontal and vertical directions are respectively 320 dots and 240 dots.

Further, the camera data converter 225 supplies as this camera display position instructing signal 230 a single bit signal which is "0" when the scanning position of the monitor device 184 is a position the camera image display position 199 is not to be displayed or "1" when it is a position where the camera image display position 199 is to be displayed. The camera display parallel data 229 is presumed to be display data of eight bits each of RGB (16.7 million color display).

Next, the camera data selector 235, in accordance with the camera display position instructing signal 230, switches the superposed display data 35 and the camera display parallel data 229 so as to supply the camera display parallel data 229 in the display timing of the camera image display position 199, and supplies the data to the liquid data converter 36 as camera superposed display data 236. The superposed display data 35 is supplied when the camera display position instructing signal 230 is "0" and the camera display parallel data 229 is supplied when the signal is "11".

The liquid data converter 36 converts the camera superposed display data 236, which is parallel RGB data of eight bits each, into input signals for the liquid crystal display 26, and supplies the converted data as the liquid crystal display data 25.

This makes it possible to display an image represented by camera input signals from the camera 188 connected to the monitor device 184 within the display image 6 of the first PC 2 displayed on the monitor device 184 as the camera display image 199.

Also, the monitor device 184 may send, according to a specific manipulation of the keyboard 191 connected to the monitor device 184, the camera input signals from the camera 188 to the first PC 2 or the second PC 3 as communication data.

Further, the position and size of the camera display image position 199 may be disposed to be alterable by the same technique as that for the display image 3 of the second PC 3 described above.

Modes of implementing the present invention have been described so far.

As hitherto described, the invention can provide a monitor device which is capable of displaying output display images of a plurality of computers at the same time. The invention also enables the user to use, without having to leave a specific input device, that specific input device and a specific monitor device as the monitor device and input device of a plurality of computers.

What is claimed is:

1. A monitor device for displaying images from a plurality of computers, comprising:

a plurality of display data interface units for receiving display data from individual computers;

a plurality of communication data interface units for inputting/outputting communication data including destination information and alteration information for a form of superposed displaying of said display data, from/to individual computers;

a superposed display unit for superposed displaying two or more display data received from two or more display data interface units;

a display controller for altering the form of the superposed displaying of said display data on the basis of said alteration information included in said communication data input, via said communication data interface units;

a communication controller for controlling transmission of said communication data input, via said communication data interface units, to any one of said display controller and individual computers on the basis of said destination information included in said communication data, wherein said communication controller is also configured to receive input information from an input device, to transmit said input information as said communication data to said display controller if said input information includes alteration information for the form of superposed displaying of said display data, or alternatively, to transmit said input information as said communication data to any one of said individual computers, via said communication data interface units, on the basis of switching by said input device if said input information includes information other than sold alteration information.

2. A monitor device, as claimed in claim 1, wherein:

said alteration information includes information indicating display characteristics of images represented by said display data; and said display controller alters the display characteristics of the images on the basis of said alteration information included in said communication data input, via said communication data interface units.

3. A monitor device as claimed in claim 1, wherein:

said alteration information includes information indicating display characteristics of images represented by said display data; and said display controller alters the display characteristics of the images on the basis of said alteration information included in said input data input, via said input device.

4. A monitor device as claimed in claim 1, wherein said communication controller receives communication data input from a first computer, via a first communication data interface unit, destined for a second computer, and transmits said communication data to the second computer, via a second communication interface unit.

5. A monitor device as claimed in claim 1, further comprising:

an image data input interface unit for inputting image data from a camera, wherein said superposed display unit performs superposed displaying of not only two or more display data input, via two or more of said display data interface units, but also image data input from the camera, via said image data input interface unit.

6. A monitor device as claimed in claim 1, wherein:

said superposed display unit displays, as said superposed displaying, a first window in which first display data input, via a first display data interface unit is displayed within second display data input, via a second display data interface unit, and said display controller alters, as alteration of the form of superposed displaying, the position and size of a second window in which the second display data input, via said second display data interface unit, is displayed.

7. A monitor device for displaying images from a plurality of computers, comprising:

a display panel;

first interface units coupled to receive display data from at least first and second computers;

second interface units coupled to input/output communication data including destination information and alteration information from/to first and second computers;

a communication controller coupled to the second interface units, to identify the destination of said communication data and enable transmission of said communication data based on the destination information, including one of the first and second computers, via the second interface units; and a display controller coupled to the first interface units, to superpose display data received from the first and second computers, via the first interface units, for superposed "picture-in-picture" displaying of said display data received from the first and second computers on the display panel;

wherein the display controller is also configured to alter display characteristics of the superposed "picture-in-picture" displaying of said display data received from the first and second computers on the display panel, on the basis of the alteration information included in said communication data from one of the first and second computers.

8. A monitor device as claimed in claim 7, wherein the communication controller is also configured to receive input information from an input device, to transmit said input information as said communication data to the display controller if said input information includes alteration information for superposed "picture-in-picture" displaying of said display data, or alternatively, to transmit said input information as said communication data to one of the first and second computers, via the second interface units, if said input information includes information other than said alteration information.

9. A monitor device as claimed in claim 7, wherein:

the alteration information includes information indicating display characteristics of images represented by said display data on the display panel; and the display controller alters the display characteristics of the images on the basis of the alteration information included in said communication data input, via the second interface units.

10. A monitor device as claimed in claim 7, wherein:

the alteration information includes information indicating display characteristics of images represented by said display data on the display panel; and the display controller alters the display characteristics of the images on the basis of the alteration information included in the input data input, via said input device.

11. A monitor device as claimed in claim 7, further comprising:

an image data interface unit for inputting image data from a camera, wherein said superposed display unit performs superposed displaying of not only display data from the first and second computers, via the first interface units, but also image data from the camera input, via the image data interface unit.

12. A monitor device as claimed in claim 7, wherein the communication controller comprises:

a communication data identifier unit arranged to identify the destination of said communication data received from one of the first and second computers, to transmit said communication data received from the first computer to the second computer if the destination is the second computer, via the second interface units, or alternatively, to transmit said communication data received from the second computer to the first computer, via the second interface units;

a window information generating unit arranged to generate a resolution signal and a display position signal to the display controller for controlling the resolution and position of images corresponding to display data from the second computer, on the display panel; and a data conversion generating unit arranged to generate display control signals to the display controller for controlling the contrast, brightness and position adjustment of images corresponding to display data from the first and second computers, on the display panel.

* * * * *